(No Model.)

H. SCHNEIDER.
BICYCLE OR TRICYCLE ATTACHMENT.

No. 589,305. Patented Aug. 31, 1897.

Witnesses:
A. R. Appleman Jr.
A. M. Murray

Inventor:
Hippolyte Schneider
By Henry C. Evert, Atty.

UNITED STATES PATENT OFFICE.

HIPPOLYTE SCHNEIDER, OF PITTSBURG, PENNSYLVANIA.

BICYCLE OR TRICYCLE ATTACHMENT.

SPECIFICATION forming part of Letters Patent No. 589,305, dated August 31, 1897.

Application filed August 21, 1896. Serial No. 603,490. (No model.)

*To all whom it may concern:*

Be it known that I, HIPPOLYTE SCHNEIDER, a citizen of the United States of America, residing at Pittsburg, in the county of Allegheny and State of Pennsylvania, have invented certain new and useful Improvements in Bicycle and Tricycle Attachments, of which the following is a specification, reference being had therein to the accompanying drawings.

This invention relates to certain new and useful improvements in bicycle attachments and will also be applicable to tricycles and like vehicles.

The principal object of my invention is to construct a crank whereby the stroke of the same may be shortened or lengthened by the rider at will without dismounting from the wheel or decreasing the speed to accomplish the above result, thus affording the rider the advantage of a greater leverage for riding on roads having considerable grade, making the work easier, tending to lessen the strain on the rider, and to a considerable extent obviating the danger of over exertion.

With the above and other objects in view the invention finally consists in the novel construction, combination, and arrangement of parts, to be hereinafter more specifically described, and particularly pointed out in the claim.

In describing the invention in detail reference is had to the accompanying drawings, forming a part of this specification, and wherein like letters of reference indicate similar parts throughout the several views, in which—

Figure 1:
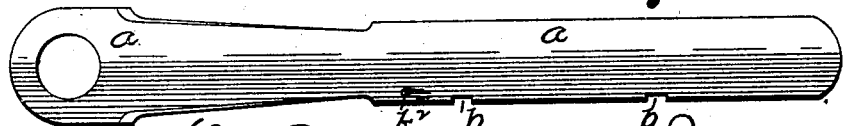
Figure 2:
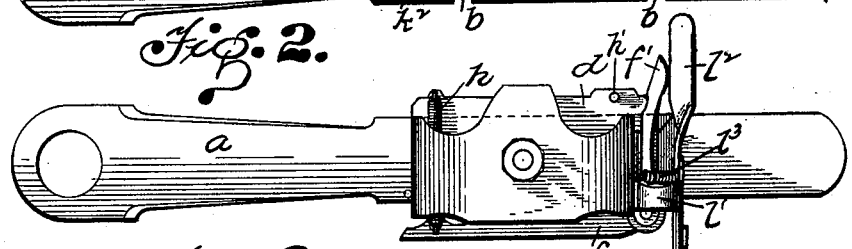
Figure 3:
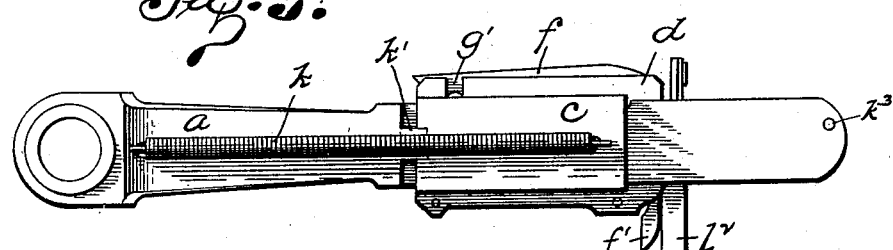
Figure 4:
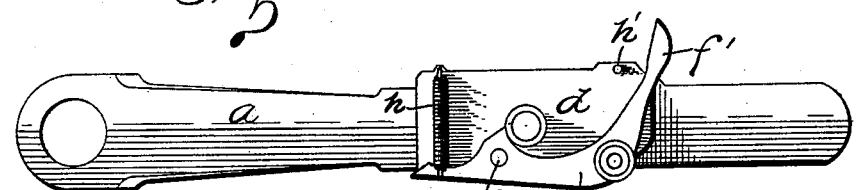
Figure 5:
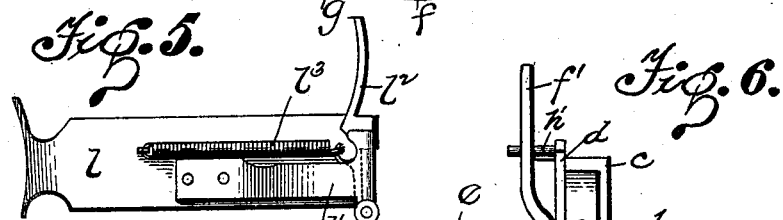
Figure 6:
Figure 7:
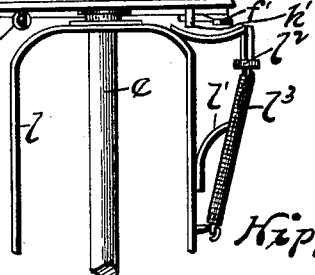

Figure 1 is a side view of the crank, and Fig. 2 is a similar view with the pedal and attachment in position. Fig. 3 is a side view of the reverse side from that shown in Fig. 2. Fig. 4 is a side view of the crank and attachment with the pedal removed. Fig. 5 is a front view of the pedal. Fig. 6 is a front view of the crank and attachment with the pedal removed. Fig. 7 is a top plan view of the pedal broken away.

Referring to the drawings by reference-letters, $a$ represents the crank, which is secured to the crank-shaft in any suitable manner and is provided on one edge with notches $b\ b$.

A casing or box $c$ is adapted to slide on the crank $a$, one side of said casing consisting of a plate $d$ of greater width than the casing and to which is secured the pedal-shaft $e$. A trip-lever consisting of a horizontal portion $f$ and upwardly-extending portion $f'$ is pivotally secured to the plate, said horizontal portion carrying a pin $g$, which engages through a notch $g'$ in the plate $d$ and casing $c$ and in the notch $b$ of the crank to hold the casing in the desired position. A spring $h$ is attached to the rear end of the portion $f$ and to the plate $d$ near the top to keep this pin normally in engagement with the crank. A stop-pin $h'$ is secured in the plate $d$ back of the trip-lever to limit the throw of the lever $f'$, and a coil-spring $k$ is attached to the crank $a$ near the inner end and to the casing $c$ to return the pedal from the long to the short stroke when the catch is released, said crank having an offset $k'$ on the one side and a pin $k^2$ on the other side to limit the backward movement of the casing, and a pin $k^3$ in the front end of the crank limits the forward movement.

The pedal $l$, which is secured to its shaft in any suitable manner, carries a brace $l'$, to which is pivotally attached a lever $l^2$, adapted to be forced in engagement with the lever $f'$ to operate the same, and a spring $l^3$, attached to the lever $l^2$ and the pedal, holds the said lever normally out of engagement.

We will now assume for the purpose of illustration that the parts have been secured in their respective positions and that the crank is attached to its shaft on the machine, the pedal being at the short stroke, as shown in Figs. 2, 3, and 4, and it is desired to extend the same and use the long stroke. The rider presses the side of the foot against the lever $l^2$, forcing the lug of the same toward the crank and into engagement with the trip-lever $f'$, forcing the pin $g$ out of its engagement with the casing and crank, when by pressing downward with the foot the rider forces the pedal outward along the crank until the spring $g$ comes in contact with the outer slot $b$, when it will engage and hold the pedal in this position. To release the same and again employ the short stroke, the lever $l^2$ is again forced into engagement with the lever $f'$, releasing the catch $g$, and when the pressure of the foot on the pedal is relieved the coil-spring $k$ will return the pedal to its short stroke, when the pin $g$ again engages and retains same.

Having fully described my invention, what I claim as new, and desire to secure by Letters Patent, is—

In a device of the character described, a crank provided with notches along one side, a casing slidable on the crank, a plate of greater width than the casing forming a side thereto, a pedal-shaft secured to said plate, an angular trip pivoted to the plate, a pin carried by the angular lever sliding in an opening in the plate and engaging one of the notches of the crank, a spring connecting one end of the angular lever to the plate, a coil-spring connecting the casing to the inner end of the crank, an offset and pin on the crank to limit the movements of the casing thereon, a pedal journaled on the pedal-shaft, a brace carried by the pedal, a lever pivoted to the brace adapted to engage the angular lever to operate same and a spring connecting said lever to the pedal for normally keeping the lever out of engagement with the angular lever as described.

In testimony whereof I affix my signature in presence of two witnesses.

HIPPOLYTE SCHNEIDER.

Witnesses:
ALFRED M. WILSON,
H. E. SEIBERT.